(12) United States Patent
Lee (10) Patent No.: US 11,185,726 B2
(45) Date of Patent: Nov. 30, 2021

(54) BATTERY PACK INCLUDING FIRE EXTINGUISHING SYSTEM

(71) Applicant: SAMSUNG SDI CO., LTD., Yongin-si (KR)

(72) Inventor: Choonghoon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 88 days.

(21) Appl. No.: 16/476,032

(22) PCT Filed: Oct. 31, 2017

(86) PCT No.: PCT/KR2017/012160
§ 371 (c)(1),
(2) Date: Aug. 14, 2019

(87) PCT Pub. No.: WO2018/139737
PCT Pub. Date: Aug. 2, 2018

(65) Prior Publication Data
US 2019/0351268 A1    Nov. 21, 2019

(30) Foreign Application Priority Data

Jan. 26, 2017 (KR) .................. 10-2017-0012961

(51) Int. Cl.
*H01M 10/63* (2014.01)
*H01M 50/30* (2021.01)
(Continued)

(52) U.S. Cl.
CPC ............ *A62C 3/16* (2013.01); *A62C 37/40* (2013.01); *A62C 99/0018* (2013.01);
(Continued)

(58) Field of Classification Search
CPC ..................................... H01M 10/63
See application file for complete search history.

(56) References Cited

U.S. PATENT DOCUMENTS

2003/0180582 A1* 9/2003 Masumoto .......... H01M 2/1066
429/7
2011/0000801 A1* 1/2011 Hirakawa .............. A62C 35/02
206/223
(Continued)

FOREIGN PATENT DOCUMENTS

CN        1195202 A    10/1998
CN     101801466 A     8/2010
(Continued)

OTHER PUBLICATIONS

International Search Report of corresponding PCT/KR2017/012160, dated Feb. 5, 2018, 3 pages + 2 pages of English translation.
(Continued)

*Primary Examiner* — Brian R Ohara
(74) *Attorney, Agent, or Firm* — Lewis Roca Rothgerber Christie LLP (57) ABSTRACT

A battery pack includes a fire extinguishing system. The battery pack includes: a housing; a battery module in the housing and including a plurality of spaced apart battery cells; an agent storage unit storing a fire extinguishing agent and injecting the fire extinguishing agent into the housing when an abnormal temperature is detected; a first perforated plate at a side of an inflow passage of the housing where the fire extinguishing agent flows from the agent storage unit to
(Continued)

the housing, including a plurality of first opening holes for passing the fire extinguishing agent and guiding the fire extinguishing agent to a connection passage between the respective battery cells, and uniformly distributing the fire extinguishing agent injected into the connection passage from the inflow passage through the plurality of first opening holes; and a fan discharging the fire extinguishing agent injected into the housing to the outside thereof.

10 Claims, 7 Drawing Sheets (51) Int. Cl.
| | | |
|---|---|---|
| *H01M 50/383* | (2021.01) | |
| *H01M 10/48* | (2006.01) | |
| *A62C 3/16* | (2006.01) | |
| *A62C 37/40* | (2006.01) | |
| *A62C 99/00* | (2010.01) | |

(52) U.S. Cl.
CPC ....... *A62C 99/0027* (2013.01); *H01M 10/486* (2013.01); *H01M 10/63* (2015.04); *H01M 50/383* (2021.01); *H01M 50/394* (2021.01); *H01M 2200/10* (2013.01); *H01M 2200/20* (2013.01)

(56) References Cited

U.S. PATENT DOCUMENTS

| | | | |
|---|---|---|---|
| 2011/0189511 A1* | 8/2011 | Yoon | H01M 10/61 |
| | | | 429/50 |
| 2011/0250477 A1 | 10/2011 | Yoshida et al. | |
| 2014/0023887 A1* | 1/2014 | Lim | H01M 10/486 |
| | | | 429/50 |
| 2014/0186668 A1* | 7/2014 | Jung | A62C 3/00 |
| | | | 429/61 |

FOREIGN PATENT DOCUMENTS

| | | | |
|---|---|---|---|
| CN | 103208602 A | | 7/2013 |
| CN | 103782444 A | | 5/2014 |
| JP | 2010-153117 A | | 7/2010 |
| KR | 10-2007-0006000 A | | 1/2007 |
| KR | 10-0778435 B1 | | 11/2007 |
| KR | 10-2012-0069334 A | | 6/2012 |
| KR | 10-2012-0108677 A | | 10/2012 |
| KR | 10-1238062 B1 | | 2/2013 |
| KR | 10-1424704 B1 | | 7/2014 |
| KR | 10-2016-0032843 A | | 3/2016 |

OTHER PUBLICATIONS

International Written Opinion of corresponding PCT/KR2017/012160, dated Feb. 5, 2018, 4 pages.
Chinese Office action for Application No. 201780084794.6, dated Aug. 17, 2021, 23 pages.

* cited by examiner

BATTERY PACK INCLUDING FIRE EXTINGUISHING SYSTEM

CROSS-REFERENCE TO RELATED APPLICATION(S)

This application is a National Phase Patent Application and claims priority to and the benefit of International Application Number PCT/KR2017/012160, filed on Oct. 31, 2017, which claims priority to Korean Patent Application Number 10-2017-0012961, filed on Jan. 26, 2017, the entire contents of all of which are incorporated herein by reference.

TECHNICAL FIELD

The present disclosure relates to a battery pack including a fire extinguishing system.

BACKGROUND ART

Recently, a high-output secondary battery using a non-aqueous electrolyte of high energy density has been developed, and a plurality of high-output secondary batteries are connected in series to construct a large-capacity secondary battery that may be used to drive a motor of a device requiring large power, such as an electric vehicle.

As such, a large-capacity secondary battery (hereinafter referred to as a 'battery pack' throughout the specification for convenience of description) generally includes a plurality of battery cells connected in series or in parallel, and each of the battery cells includes an electrode assembly including a positive plate and a negative plate with a separator therebetween, a case having a space portion in which the electrode assembly is embedded, a cap assembly coupled with the case to seal the case, and positive and negative terminals protruding to the cap assembly and electrically connected to a current collector of the positive and negative plates included in the electrode assembly.

Generally, in the case of a square battery, as for each battery cell, unit cells are arranged to intersect with each other such that a positive terminal and a negative terminal protruding above a cap assembly intersect with a positive terminal and a negative terminal of an adjacent unit cell, and a conductor is connected and installed between the screw-processed positive terminal and negative terminal through a nut to construct a battery pack.

Here, as for the battery pack, because several to several tens of battery cells are connected to construct a battery pack, heat generated from each battery cell should be easily dissipated, and for example, in the case of a secondary battery applied to a hybrid electric vehicle (HEV), temperature management may be more important than anything else.

For example, when heat dissipation is not properly performed, heat generated from each battery cell may cause a temperature rise of a battery pack, thus resulting in malfunction of a device to which the battery pack is applied.

Particularly, in the case of an HEV battery pack used in a vehicle, because it is charged/discharged by a large current, heat may be generated by the internal reaction of a secondary battery and it may heat up to a considerable temperature depending on the usage state thereof, thus affecting the unique characteristics of the battery and degrading the unique performance of the battery.

Thus, in the case of an HEV battery pack applied to a vehicle or the like, it may include a fire extinguishing system to maintain the temperature of the battery pack in a proper state and to prevent damage to the battery and safety accidents as a result.

Information disclosed in this Background Art section was already known to the inventors before achieving embodiments of the present disclosure or is technical information acquired in the process of achieving embodiments of the present disclosure, and therefore, it may contain information that does not form the prior art that is already known to the public in this country.

DESCRIPTION OF EMBODIMENTS

Technical Problem

Provided is a battery pack including a fire extinguishing system that may, in the event of an explosion due to abnormal heating of a battery cell, minimize thermal diffusion to an adjacent battery cell and stabilize the temperature of the battery pack within a short time to prevent thermal diffusion to the outside.

Solution to Problem

According to an aspect of the present disclosure, a battery pack including a fire extinguishing system includes: a housing; a battery module arranged in the housing and including a plurality of battery cells spaced apart from each other by a certain distance; an agent storage unit storing a fire extinguishing agent and injecting the fire extinguishing agent into the housing when an abnormal temperature is detected at the battery module; a first perforated plate arranged on a side of an inflow passage of the housing where the fire extinguishing agent flows from the agent storage unit to the housing, including a plurality of first opening holes for passing the fire extinguishing agent and guiding the fire extinguishing agent to a connection passage arranged between the respective battery cells, and uniformly distributing the fire extinguishing agent injected into the connection passage from the inflow passage through the plurality of first opening holes; and a fan discharging the fire extinguishing agent injected into the housing to the outside thereof, wherein the fire extinguishing agent that sequentially passed through the inflow passage and the connection passage is captured in a discharge passage of the housing, and the fire extinguishing agent captured in the discharge passage is discharged outside the housing by the fan.

Advantageous Effects of Disclosure

According to the battery pack including the fire extinguishing system according to embodiments of the present disclosure, forcible fire extinguishing gas may be injected into the battery pack to rapidly control thermal diffusion and minimize damage caused by chain explosion.

However, the scope of the present disclosure is not limited to these effects.

BEST MODE

According to an embodiment of the present disclosure, a battery pack including a fire extinguishing system includes: a housing; a battery module arranged in the housing and including a plurality of battery cells spaced apart from each other by a certain distance; an agent storage unit storing a fire extinguishing agent and injecting the fire extinguishing agent into the housing when an abnormal temperature is detected at the battery module; a first perforated plate arranged on a side of an inflow passage of the housing where the fire extinguishing agent flows from the agent storage unit to the housing, including a plurality of first opening holes for passing the fire extinguishing agent and guiding the fire extinguishing agent to a connection passage arranged between the respective battery cells, and uniformly distributing the fire extinguishing agent injected into the connection passage from the inflow passage through the plurality of first opening holes; and a fan discharging the fire extinguishing agent injected into the housing to the outside thereof, wherein the fire extinguishing agent that sequentially passed through the inflow passage and the connection passage is captured in a discharge passage of the housing, and the fire extinguishing agent captured in the discharge passage is discharged outside the housing by the fan.

In the present embodiment, a vent hole may be formed on one side of the plurality of battery cells to be automatically opened when an internal temperature or pressure of the plurality of battery cells rises above a reference value, and when one side of the plurality of battery cells, where the vent hole is formed, is referred to as a first position and the other side of the plurality of battery cells opposite to the first position is referred to as a second position, the inflow passage may be formed at the second position and the discharge passage may be formed at the first position.

In the present embodiment, the battery pack may further include: a temperature sensor detecting a temperature of the battery module; a calculation unit calculating an output signal detected by the temperature sensor; a comparison unit comparing a value calculated by the calculation unit with a stored reference value to detect whether a fire has occurred at the battery module; and an output unit controlling whether to open/close the agent storage unit according to a signal of the comparison unit.

In the present embodiment, the battery pack may further include a second perforated plate arranged on an upstream side of the first perforated plate in the inflow passage and including a plurality of second opening holes for passing the fire extinguishing agent, wherein the second perforated plate may uniformly distribute the fire extinguishing agent flowing in the inflow passage through the plurality of second opening holes.

In the present embodiment, the plurality of second opening holes may have a shape of one of a circle, an ellipse, and a polygon.

In the present embodiment, the agent storage unit may include a valve allowing or blocking flow of the fire extinguishing agent from the agent storage unit to the inflow passage.

In the present embodiment, the plurality of first opening holes may have a shape of one of a circle, an ellipse, and a polygon.

In the present embodiment, the plurality of first opening holes may have a same size.

In the present embodiment, sizes of the plurality of first opening holes may increase gradually away from the agent storage unit.

In the present embodiment, the fire extinguishing agent may include at least one of argon, nitrogen, and carbon dioxide.

These and/or other aspects, features, and advantages will become apparent from the accompanying drawings, the appended claims, and the following detailed description of the present disclosure.

MODE OF DISCLOSURE

The present disclosure may include various embodiments and modifications, and certain embodiments thereof are illustrated in the drawings and will be described herein in detail. The effects and features of the present disclosure and the accomplishing methods thereof will become apparent from the following description of the embodiments taken in conjunction with the accompanying drawings. However, the present disclosure is not limited to the embodiments described below, and may be embodied in various modes.

It will be understood that although the terms "first", "second", etc. may be used herein to describe various components, these components should not be limited by these terms and these terms are only used to distinguish one component from another component. Also, as used herein, the singular forms "a", "an", and "the" are intended to include the plural forms as well, unless the context clearly indicates otherwise. Also, it will be understood that the terms "comprise", "include", and "have" used herein specify the presence of stated features or components, but do not preclude the presence or addition of one or more other features or components.

Also, the sizes of components in the drawings may be exaggerated for convenience of description. In other words, since the sizes and thicknesses of components in the drawings are arbitrarily illustrated for convenience of description, the present disclosure is not limited thereto.

Hereinafter, embodiments of the present disclosure will be described in detail with reference to the accompanying drawings, and in the following description, like reference numerals will denote like elements and redundant descriptions thereof will be omitted.

Figure 1:
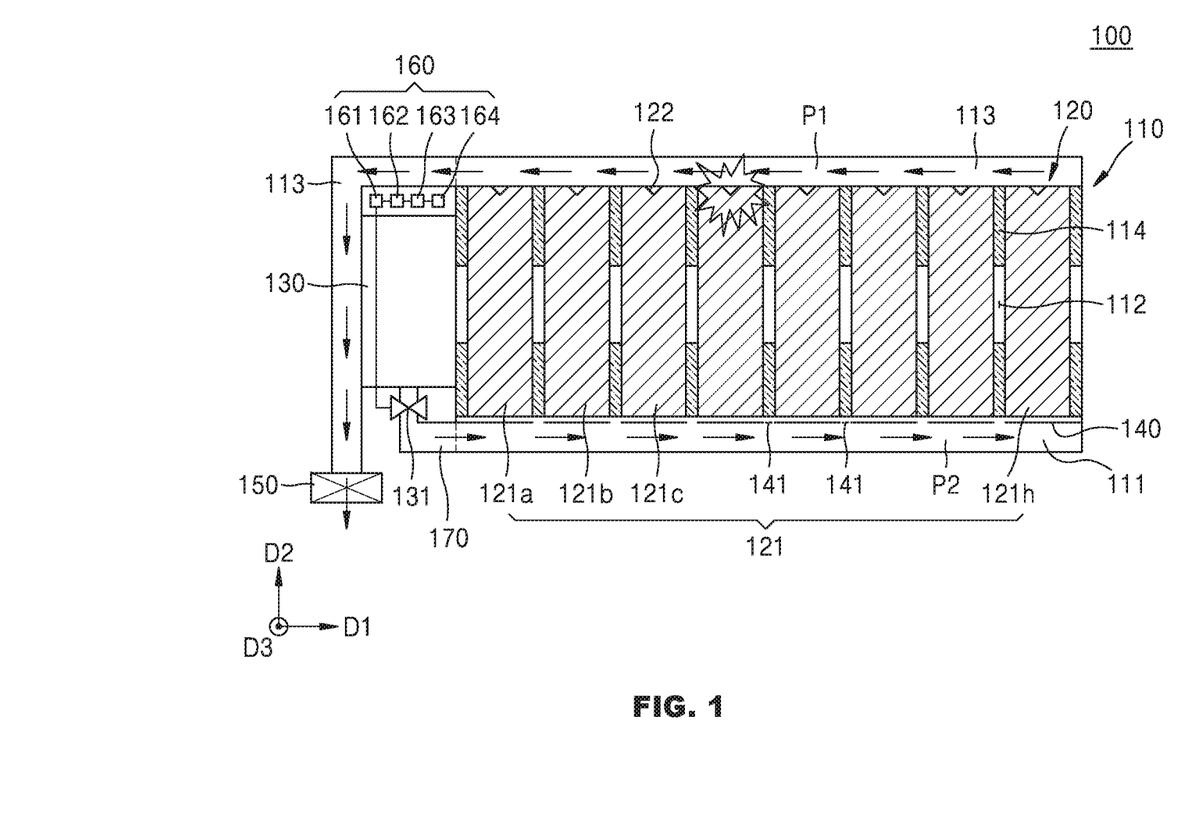
FIG. 1 is a schematic diagram illustrating a schematic configuration of a battery pack including a fire extinguishing system according to an embodiment of the present disclosure.
Figure 2:
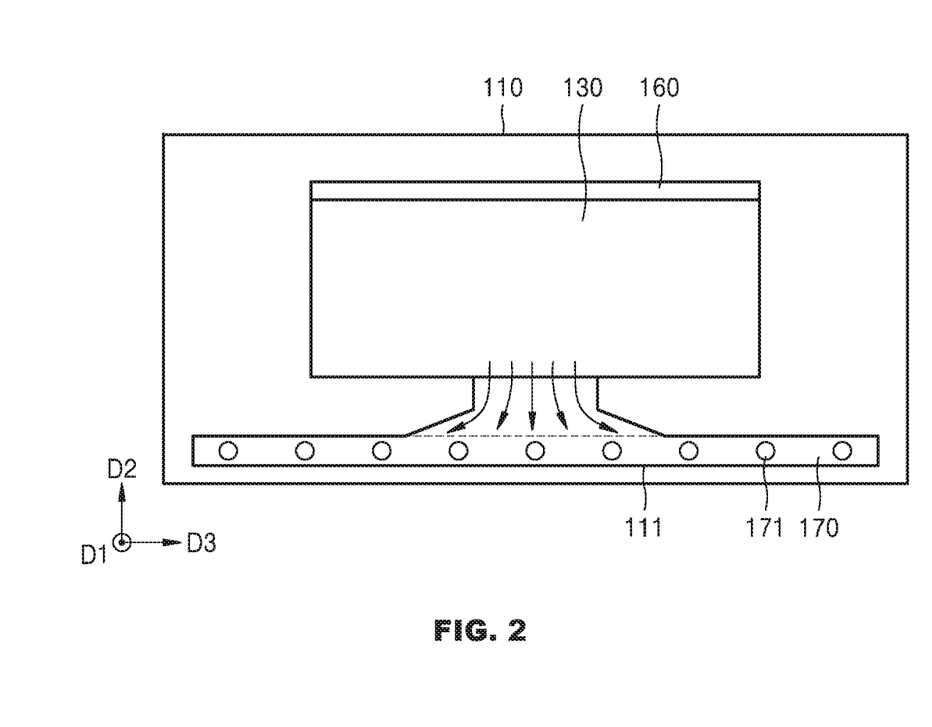
FIG. 2 is a side schematic view illustrating a schematic connection structure of an agent storage unit, an inflow passage, and a second perforated plate of the battery pack including the fire extinguishing system illustrated in FIG. 1.
Figure 3:
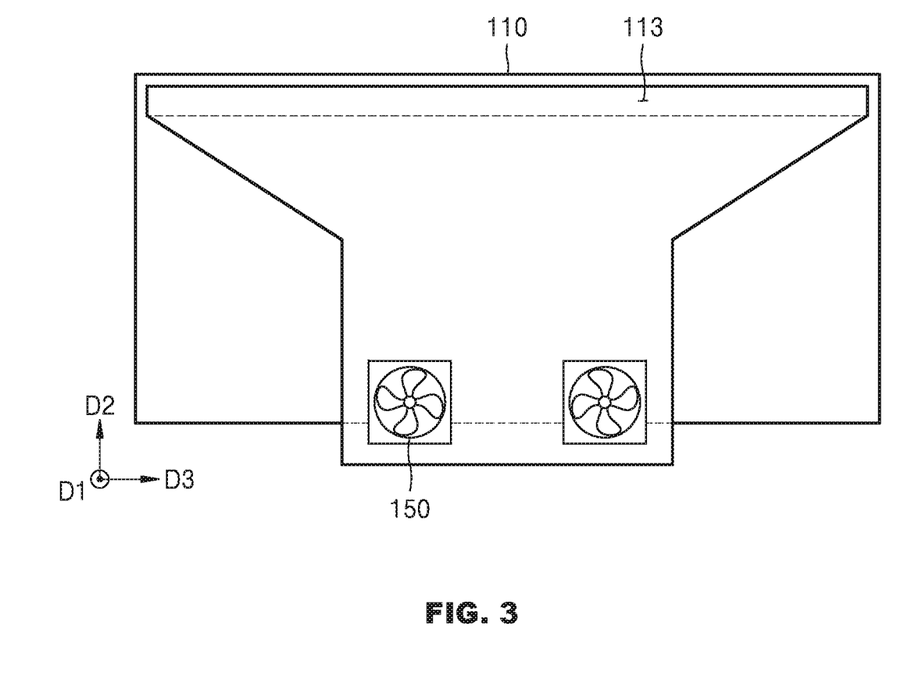
FIG. 3 is a side schematic view illustrating a schematic connection structure of a discharge passage and a fan of the battery pack including the fire extinguishing system illustrated in FIG. 1.

FIG. 1 is a schematic diagram illustrating a schematic configuration of a battery pack including a fire extinguishing system according to an embodiment of the present disclosure, FIG. 2 is a side schematic view illustrating a schematic connection structure of an agent storage unit, an inflow passage, and a second perforated plate of the battery pack including the fire extinguishing system illustrated in FIG. 1, and FIG. 3 is a side schematic view illustrating a schematic connection structure of a discharge passage and a fan of the battery pack including the fire extinguishing system illustrated in FIG. 1.

Referring to FIGS. 1 to 3, a battery pack 100 (hereinafter referred to as "battery pack") including a fire extinguishing system according to an embodiment of the present disclosure may include a housing 110, a battery module 120, an agent storage unit 130, a first perforated plate 140, a fan 150, a controller 160, and a second perforated plate 170.

The housing 110 may be a component accommodating therein the main components of the battery pack 100, such as the battery module 120, the agent storage unit 130, and the first perforated plate 140. However, the housing 110 is not limited to this structure; for example, the housing 110 may accommodate the battery module 120 and the first perforated plate 140, and the agent storage unit 130 may be installed outside the housing 110.

Although FIG. 1 illustrates that the agent storage unit 130 is installed at the housing 110 and covered by a discharge passage 113 but not covered by an inflow passage 111 (i.e., installed outside the housing 110), embodiments of the present disclosure are not limited thereto. That is, the position of the agent storage unit 130 illustrated in FIG. 1 is provided for convenience of description, and the agent storage unit 130 may be installed inside the housing 110.

Also, the fan 150 may be installed at the housing 110, wherein the fan 150 may be installed at one or more of the inflow passage 111 and the discharge passage 113 of the housing 110. However, hereinafter, for convenience of description, a case where the fan 150 is installed on the side of the discharge passage 113 will be mainly described.

Next, the battery module 120 may include a plurality of battery cells 121 that may be installed inside the housing 110, fixed by a holder 114, and spaced apart from each other by a certain distance. Although FIG. 1 illustrates that all seven battery cells 121*a* to 121*h* are installed inside the housing 110, this is merely for convenience of description and embodiments of the present disclosure are not limited to the illustrated number of battery cells 121. That is, two or more battery cells 121 may be installed at the housing 110.

Figure 4:
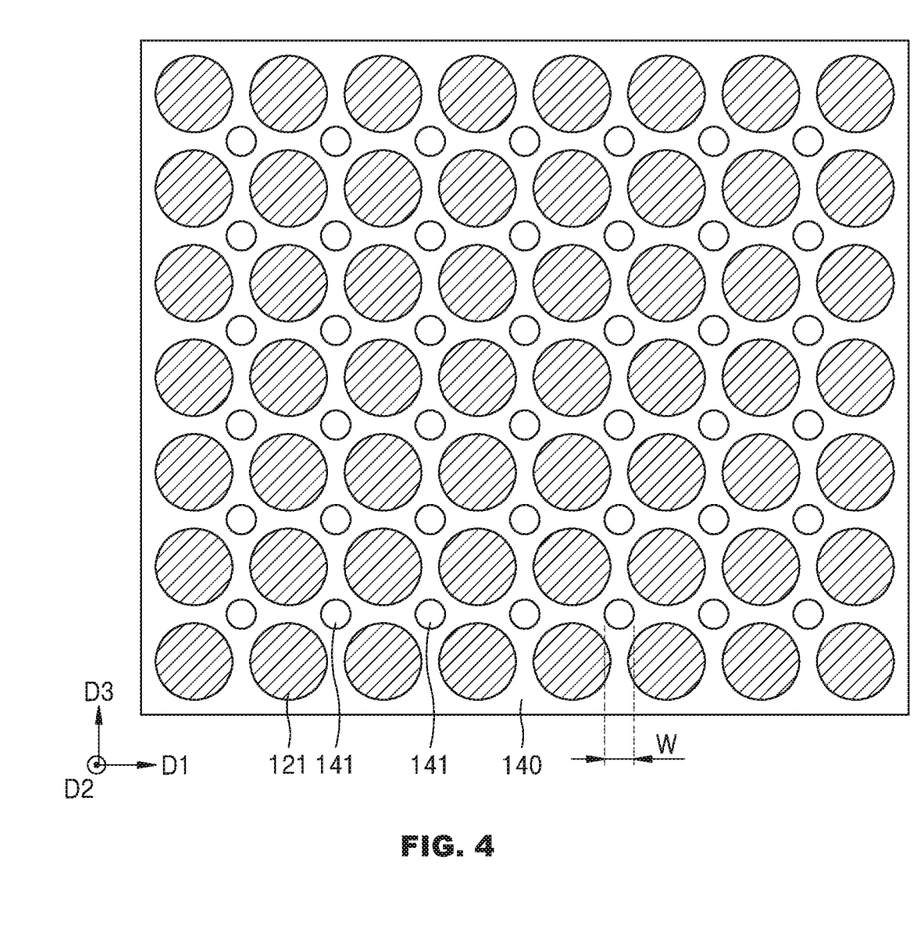
FIG. 4 is a top schematic view illustrating a schematic structure of a battery module and a first perforated plate of the battery pack including the fire extinguishing system illustrated in FIG. 1.
Figure 5:
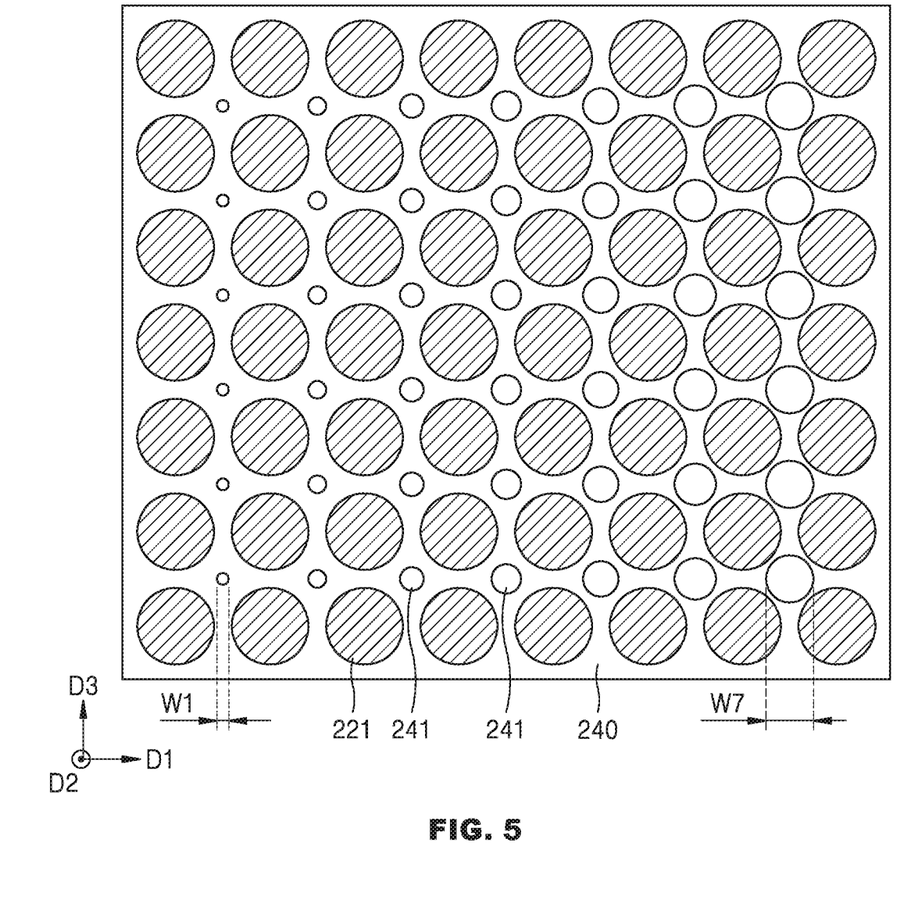
FIG. 5 is a top schematic view schematically illustrating a first modification of the first perforated plate illustrated in FIG. 4.
Figure 6:
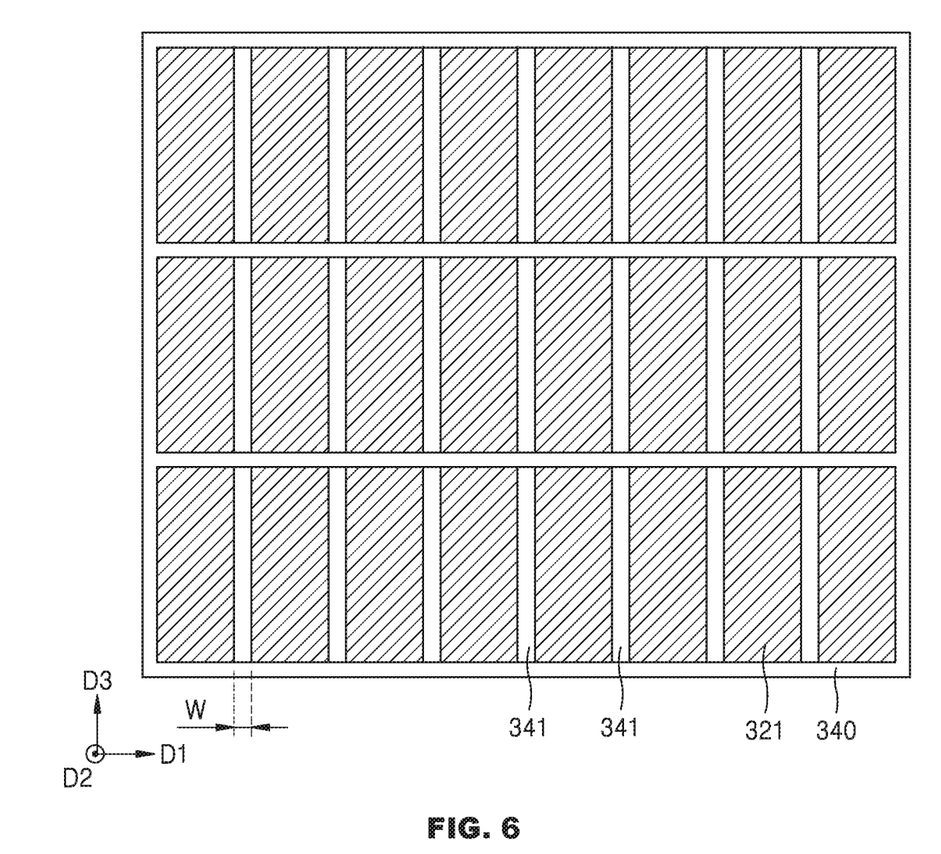
FIG. 6 is a top schematic view schematically illustrating a second modification of the first perforated plate illustrated in FIG. 4.
Figure 7:
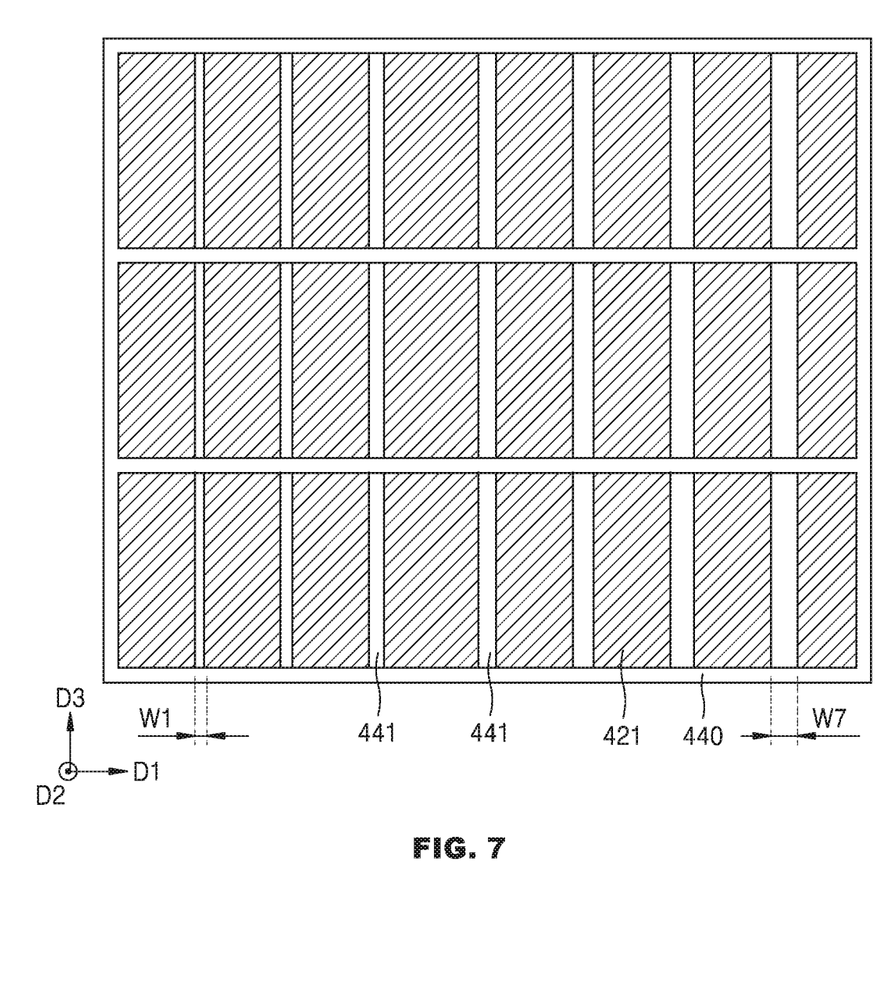
FIG. 7 is a top schematic view schematically illustrating a third modification of the first perforated plate illustrated in FIG. 4.

Meanwhile, the battery cell 121 may include a circular cell as illustrated in FIGS. 4 and 5 or may include a square cell as illustrated in FIGS. 6 and 7. Here, the shape of the battery cell 121 is not limited to the embodiments of the present disclosure described herein. However, the battery cells 121 may be installed at the housing 110 while being spaced apart from each other by a certain distance, and in this case, hereinafter, a space formed between the battery cells 121 will be referred to as a "connection passage 112".

Particularly, a vent hole 122 may be formed on one side of the plurality of battery cells 121 to be automatically opened when the internal temperature or pressure of the plurality of battery cells 121 rises above a reference value. Here, when one side of the plurality of battery cells 121, where the vent hole 122 is formed, will be referred to as a first position P1 and the other side of the plurality of battery cells 121 opposite to the first position P1 will be referred to as a second position P2, the inflow passage 111 of the housing may be formed at the second position P2 and the discharge passage 113 may be formed at the first position P1.

In general, when the internal temperature or pressure of the battery cell 121 rises above a reference value and thus the vent hole 122 is opened, a point where the internal material of the battery cell 121 is discharged or a fire occurs may be the first position P1. When a fire extinguishing agent ejected from the agent storage unit 130 is introduced directly to the first position P1, because the fire extinguishing agent is introduced into the connection passage 112 together with the high-temperature internal material and/or combustion product of the battery cell 121, heat may be diffused to another adjacent battery cell 121 and thus, in a severe case, the battery cells 121 may explode in a chain.

However, according to the battery pack 100 according to an embodiment of the present disclosure illustrated in FIG. 1, because the fire extinguishing agent may be introduced into the inflow passage 111 formed at the second position P2 opposite to the first position P1 where the vent hole 122 is located and then discharged through the connection passage 112 into the discharge passage 113 formed at the first position P1, an abnormality (e.g., fire or discharge of the internal material) occurring at any one battery cell 121 may be prevented from diffusing into another battery cell 121.

The agent storage unit 130 may store a fire extinguishing agent (not illustrated) and inject the fire extinguishing agent into the housing when an abnormal temperature is detected at the battery module 120. Particularly, the agent storage unit 130 may include a valve 131 allowing or blocking the flow of the fire extinguishing agent from the agent storage unit 130 to the inflow passage 111. Although FIG. 1 illustrates that the valve 131 is installed at the inflow passage 111, the valve 131 may be installed inside the agent storage unit 130. That is, the valve 131 may maintain a closed state at normal times and may be opened to inject the fire extinguishing agent into the housing 110 from the agent storage unit 130 when the fire extinguishing agent is to be injected into the battery module 120.

The fire extinguishing agent may include one or more of argon, nitrogen, and carbon dioxide. For example, when carbon dioxide is used as the fire extinguishing agent, the carbon dioxide may be liquefied and stored in the agent storage unit 130 in a low-temperature and high-pressure state. When an abnormal temperature is detected at the battery module 120, the carbon dioxide may be discharged from the agent storage unit 130 to the inside of the housing 110, that is, to the inflow passage 111, and solidified into a solid state at the same time. That is, the carbon dioxide discharged from the agent storage unit 130 may be introduced into the inflow passage 111 as fine solid particles, immediately sublimated in the inflow passage 111, and then introduced into the housing 110 in a gaseous state.

As a result, the carbon dioxide may be sublimated by absorbing the heat of the battery cell 121, and at the same time, the gaseous carbon dioxide may push the oxygen inside the housing 110 to the outside, thereby cooling the battery cell 121 and simultaneously extinguishing a fire that may occur at the battery cell 121.

The first perforated plate 140 may be installed on the side of the inflow passage 111 of the housing 110 through which the fire extinguishing agent is introduced from the agent storage unit 130 into the housing 110. Particularly, the first perforated plate 140 may be installed at a location where the fire extinguishing agent discharged from the agent storage unit 130 may be introduced into the housing 110 through the inflow passage 111 and then transmitted to the connection passage 112. Because the first perforated plate 140 includes a first opening hole 141 for passing the fire extinguishing agent, the fire extinguishing agent introduced into the inflow passage 111 may pass through the first opening hole 141 and then transmit to the connection passage 112 formed between the battery cells 121.

Particularly, the first opening hole 141 of the first perforated plate 140 may perform a function of uniformly distributing the fire extinguishing agent injected into the connection passage 112 from the inflow passage 111. That is, when the first perforated plate 140 is not installed at the inflow passage 111, because a relatively large amount of fire extinguishing agent is introduced into the connection passage 112 adjacent to the agent storage unit 130 discharging the fire extinguishing agent (the left side in a "D1" direction), whereas a relatively small amount of fire extinguishing agent is introduced into the connection passage 112 relatively distant from the agent storage unit 130 (the right side in the "D1" direction), a fire extinguishing function may be degraded if a fire occurs at the battery cell 121 distant from the agent storage unit 130.

Thus, when the first perforated plate 140 including the first opening hole 141 is installed at the inflow passage 111, a uniform fire-extinguishing effect may be obtained everywhere regardless of the relative position of the battery cell 121 and the agent storage unit 130. Meanwhile, the size and shape of the first opening hole 141 may vary according to various embodiments. For example, the first opening hole 141 may have one of a circular shape, an elliptical shape, and a polygonal shape. Also, the first opening hole 141 may have various arrangement structures, as described below in detail with reference to FIGS. 4 to 7.

Next, the fan 150 may discharge the fire extinguishing agent injected into the housing 110 to the outside. That is, the fan 150 may perform a function of forcing the flow of the fire extinguishing agent such that the fire extinguishing agent discharged from the agent storage unit 130 and introduced into the inflow passage 111 may be discharged to the outside through the connection passage 112 and the discharge passage 113.

In this respect, as illustrated in the drawing, the fan 150 may be installed at the most downstream side of the discharge passage 113, that is, at a point where the fire extinguishing agent is discharged to the outside, but is not limited thereto and may be installed, for example, at the downstream side of the agent storage unit 130 in the inflow passage 111. That is, the fan 150 may be installed adjacent to the valve 131. However, hereinafter, for convenience of description, a case where the fan 150 is installed at the most downstream side of the discharge passage 113 will be mainly described.

As illustrated in FIG. 1, the fan 150 may be installed at the discharge passage 113 such that the discharge direction of the fire extinguishing gas discharged to the outside through the discharge passage 113 may be formed in a second direction D2; however, embodiments of the present disclosure are not limited thereto. That is, although not illustrated in the drawings, the fan 150 may be installed at the discharge passage 113 such that the discharge direction of the fire extinguishing gas discharged to the outside through the discharge passage 113 may be any one of a first direction D1 (see FIG. 3), a second direction D2 (see FIG. 1), and a third direction D3 intersecting with the first direction D1 and the second direction D2.

The controller 160 may include a temperature sensor 161 for detecting the temperature of the battery module 120, a calculation unit 162 for calculating an output signal detected by the temperature sensor 161, a comparison unit 163 for comparing a value calculated by the calculation unit 162 with a stored reference value to detect whether a fire has occurred at the battery module 120, and an output unit 164 for controlling whether to open/close the agent storage unit 130 according to a signal of the comparison unit 163.

Although FIG. 1 illustrates that the temperature sensor 161 is installed in the controller 160, this is merely for convenience of description and the temperature sensor 161 may be installed at each battery cell 121 and individually connected electrically to the controller 160. That is, as for the installation position of the temperature sensor 161, the temperature sensor 161 may be installed at various positions according to the design of the battery pack 100 and may be installed at any position capable of accurately detecting the temperature of the battery cell 121.

Particularly, the temperature sensor 161 may detect the temperature of the battery cell 121 and generate output information about the temperature of the battery cell 121. Here, the output information may include, for example, a particular property value such as an electric resistance value. The temperature sensor 161 may be electrically connected to the calculation unit 162 to transmit output information about the temperature of each battery cell 121 to the calculation unit 162.

The calculation unit 162 may calculate an output signal of each battery cell 121 detected by the temperature sensor 161 and convert the same into the current temperature of the battery cell 121. The comparison unit 163 may compare the current temperature of the battery cell 121 with a preset reference temperature of the battery cell 121 to detect whether a fire has occurred at the battery module 120. The output unit 164 may open the agent storage unit 130 according to a signal received from the comparison unit 163 when a fire has occurred at the battery module 120. Also, the output unit 164 may discharge the fire extinguishing agent from the agent storage unit 130 to the inflow passage 111 by controlling the valve 131 according to the signal received from the comparison unit 163.

The second perforated plate 170 may be arranged on the upstream side of the first perforated plate 140 in the inflow passage 111 and may include a plurality of second opening holes 171 for passing the fire extinguishing agent. The second perforated plate 170 may perform a function of uniformly distributing the fire extinguishing agent flowing in the inflow passage 111 through the plurality of second opening holes 171 over the entire region in the third direction D3.

According to the battery pack 100 having the above structure according to an embodiment of the present disclosure, the fire extinguishing agent discharged from the agent storage unit 130 may be captured at the discharge passage 113 after sequentially passing through the inflow passage 111 and the connection passage 112 and the fire extinguishing agent captured at the discharge passage 113 may be discharged to the outside of the housing 110 by the fan 150.

Hereinafter, various embodiments of the size and shape of the first perforated plate 140 will be described in detail with reference to FIGS. 4 to 7.

FIG. 4 is a top schematic view illustrating a schematic structure of a battery module and a first perforated plate of the battery pack including the fire extinguishing system illustrated in FIG. 1, FIG. 5 is a top schematic view schematically illustrating a first modification of the first perforated plate illustrated in FIG. 4, FIG. 6 is a top schematic view schematically illustrating a second modification of the first perforated plate illustrated in FIG. 4, and FIG. 7 is a top schematic view schematically illustrating a third modification of the first perforated plate illustrated in FIG. 4.

Referring to FIGS. 1 and 4, the fire extinguishing agent introduced through the second perforated plate 170 into the inflow passage 111 at the second position P2 may be diffused in the first direction D1. The fire extinguishing gas introduced into the inflow passage 111 and flowing in the first direction D1 may be guided in the second direction D2 through the first opening hole 141 and then flow into the connection passage 112. In this case, the sizes of first opening holes 141 may all be the same as illustrated in FIG. 4. According to this structure, the fire extinguishing agent injected into the connection passage 112 from the inflow passage 111 through a plurality of first opening holes 141 may be uniformly distributed.

Meanwhile, referring to FIG. 5, the sizes of first opening holes 241 may increase gradually away from the agent storage unit 130 in the first direction D1. That is, the diameter of the first opening hole 241 close to the agent storage unit 130 may be W1, and the diameter of the first opening hole 241 farthest from the agent storage unit 130 may be W7, which is greater than W1.

Although FIG. 5 illustrates that the sizes of the first opening holes 241 increase linearly away from the agent storage unit 130, embodiments of the present disclosure are not limited thereto. That is, the sizes of the first opening holes 241 may increase nonlinearly away from the agent storage unit 130.

Meanwhile, FIGS. 6 and 7 illustrate a case where battery cells 321 or 421 include square cells. As such, even when the battery cells 321 or 421 are square cells, first opening holes 341 or 441 may be connected to a connection passage (not illustrated) formed between the battery cells 321 or 421 and the sizes thereof may all be the same as illustrated in FIG. 6 (see W in FIG. 6) or may increase gradually away from the agent storage unit 130 as illustrated in FIG. 7 (see W1 and W7 in FIG. 7).

Also, although FIG. 7 illustrates that the sizes of the first opening holes 441 increase linearly away from the agent storage unit 130, embodiments of the present disclosure are not limited thereto. That is, as in FIG. 5, the sizes of the first opening holes 441 of FIG. 7 may also increase nonlinearly away from the agent storage unit 130.

Although the present disclosure has been described with reference to the embodiments illustrated in the drawings, this is merely an example and those of ordinary skill in the art will understand that various modifications may be made therein. Thus, the spirit and scope of the present disclosure should be defined by the appended claims.

INDUSTRIAL APPLICABILITY

According to the battery pack including the fire extinguishing system according to the embodiments of the present disclosure described above, in the event of an explosion due to abnormal heating of a battery cell, thermal diffusion to an adjacent battery cell may be minimized and the temperature of the battery pack may be stabilized within a short time to prevent thermal diffusion to the outside.

The invention claimed is:

1. A battery pack including a fire extinguishing system, the battery pack comprising:
   a housing comprising an inflow passage and a discharge passage;
   a battery module in the housing and comprising a plurality of battery cells spaced apart from each other by connection passages, wherein the inflow passage extends along one side of the battery module and the discharge passage extends along an opposite side of the battery module and the connection passages connect the inflow passage to the discharge passage;
   an agent storage unit storing a fire extinguishing agent and for injecting the fire extinguishing agent into the housing in response to an abnormal temperature detected at the battery module such that the fire extinguishing agent flows from the agent storage unit to the housing;
   a first perforated plate on a side of the inflow passage and defining a plurality of first opening holes that are aligned with the connection passages, wherein the plurality of first opening holes pass the fire extinguishing agent and guide the fire extinguishing agent to at least one connection passage between adjacent battery cells of the plurality of battery cells, and uniformly distribute the fire extinguishing agent injected into the connection passage from the inflow passage through the plurality of first opening holes in response to the abnormal temperature detected at the battery module; and
   a fan for discharging the fire extinguishing agent injected into the housing to the outside thereof,
   wherein the fire extinguishing agent passes sequentially through the inflow passage and the connection passage and is captured in the discharge passage in response to the abnormal temperature detected at the battery module, and the fire extinguishing agent captured in the discharge passage is discharged outside the housing by the fan; and
   wherein each of the plurality of battery cells defines a vent hole that is on a side of its respective battery cell adjacent the discharge passage and opposite the inflow passage.

2. The battery pack of claim 1, wherein
the vent hole is automatically opened when an internal temperature or pressure of the plurality of battery cells rises above a reference value.

3. The battery pack of claim 1, further comprising:
a temperature sensor detecting a temperature of the battery module; a calculation unit calculating an output signal detected by the temperature sensor; a comparison unit comparing a value calculated by the calculation unit with a stored reference value to detect whether a fire has occurred at the battery module; and an output unit controlling whether to open/close the agent storage unit according to a signal of the comparison unit.

4. The battery pack of claim 1, further comprising
a second perforated plate arranged on an upstream side of the first perforated plate in the inflow passage and comprising a plurality of second opening holes for passing the fire extinguishing agent,
wherein the second perforated plate uniformly distributes the fire extinguishing agent flowing in the inflow passage through the plurality of second opening holes.

5. The battery pack of claim 4, wherein
the plurality of second opening holes have a shape of one of a circle, an ellipse, or a polygon.

6. The battery pack of claim 1, wherein
the agent storage unit comprises a valve allowing or blocking flow of the fire extinguishing agent from the agent storage unit to the inflow passage.

7. The battery pack of claim 1, wherein
the plurality of first opening holes have a shape of one of a circle, an ellipse, or a polygon.

8. The battery pack of claim 1, wherein
the plurality of first opening holes have a same size.

9. The battery pack of claim 1, wherein
sizes of the plurality of first opening holes increase gradually away from the agent storage unit.

10. The battery pack of claim 1, wherein the fire extinguishing agent comprises at least one of argon, nitrogen, or carbon dioxide.

\* \* \* \* \*